UNITED STATES PATENT OFFICE.

HENRY W. JOHNS, OF NEW YORK, N. Y.

IMPROVEMENT IN ROOFING COMPOUNDS.

Specification forming part of Letters Patent No. 76,773, dated April 14, 1868; reissue No. 5,951, dated June 30, 1874; reissue No. 6,190, dated December 22, 1874; application filed November 11, 1874.

DIVISION No. 1 OF D.

*To all whom it may concern:*

Be it known that I, HENRY W. JOHNS, of the city, county, and State of New York, have invented a new and useful Composition of Matter for Roofs and other surfaces, of which the following is a specification:

My said invention, which relates to an improved cement or mastic for coating roofs and other surfaces, consists in compounding asbestus, which is the characteristic ingredient, with lime, or its equivalent, with water, to which may be added marble-dust, sand, clay, or other equivalent substance or substances.

The asbestus may be reduced to powder or fiber by any of the well-known methods, and, after having been so prepared, it is mixed with lime in the proportions of ten pounds of asbestus to ten pounds of lime and sufficient water to produce the cement of the required consistency for use. The proportion here given has produced good results, but may be varied.

The asbestus and lime may be mixed in the required or desired proportions, and transported, and water added when the cement is to be used; but the compound may be prepared by the admixture of the asbestus, lime, and water at the time it is wanted for use.

The compound above specified may be varied by the addition of clay, marble-dust, sand, or other like substances.

What I claim as my invention, and desire to secure by Letters Patent, is—

As a cement or mastic for covering roofs or other surfaces, the compound of asbestus and lime, to be used in admixture with water, substantially as described.

HENRY W. JOHNS.

Witnesses:

T. W. BAXTER,
C. H. PATRICK.